Patented July 16, 1935

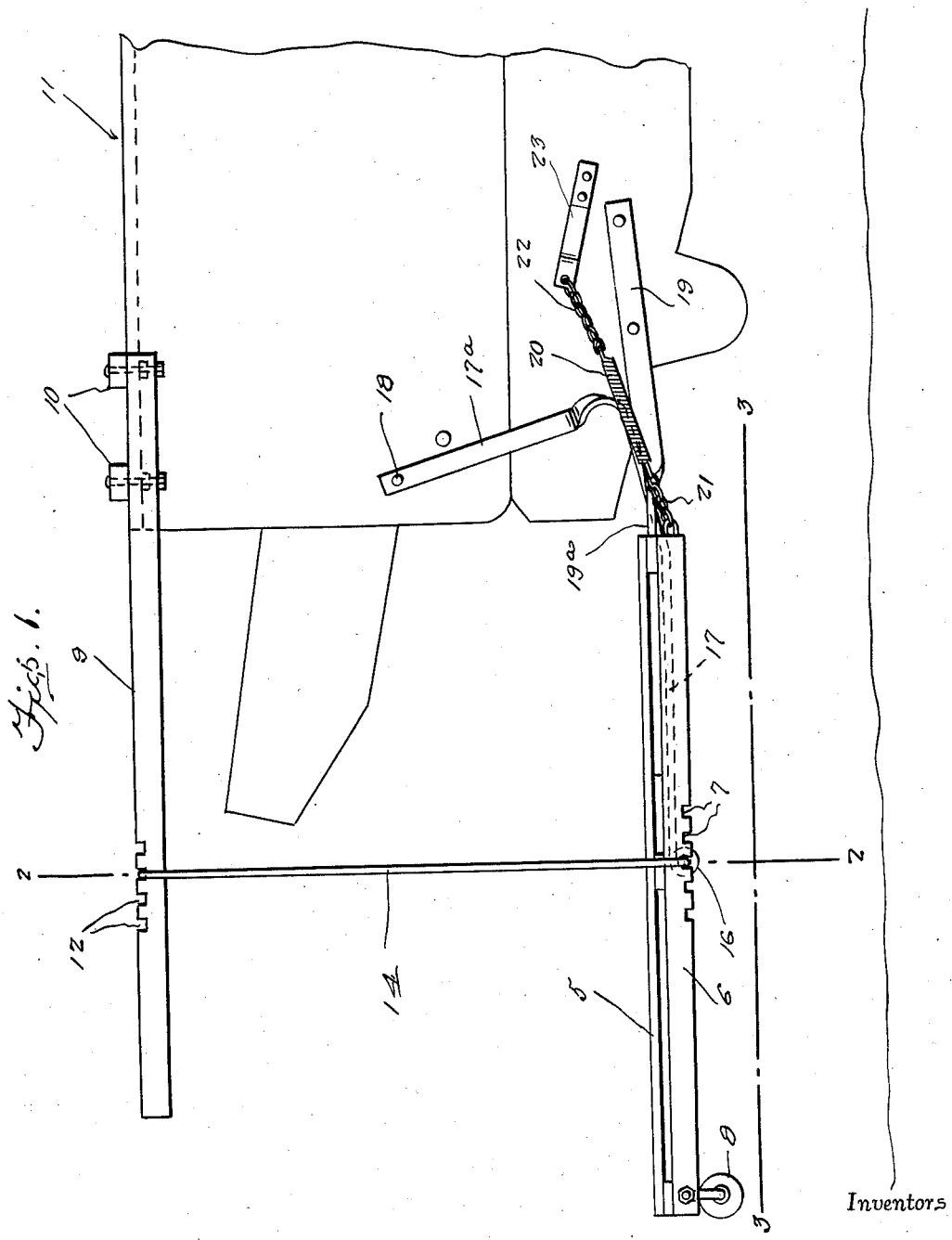

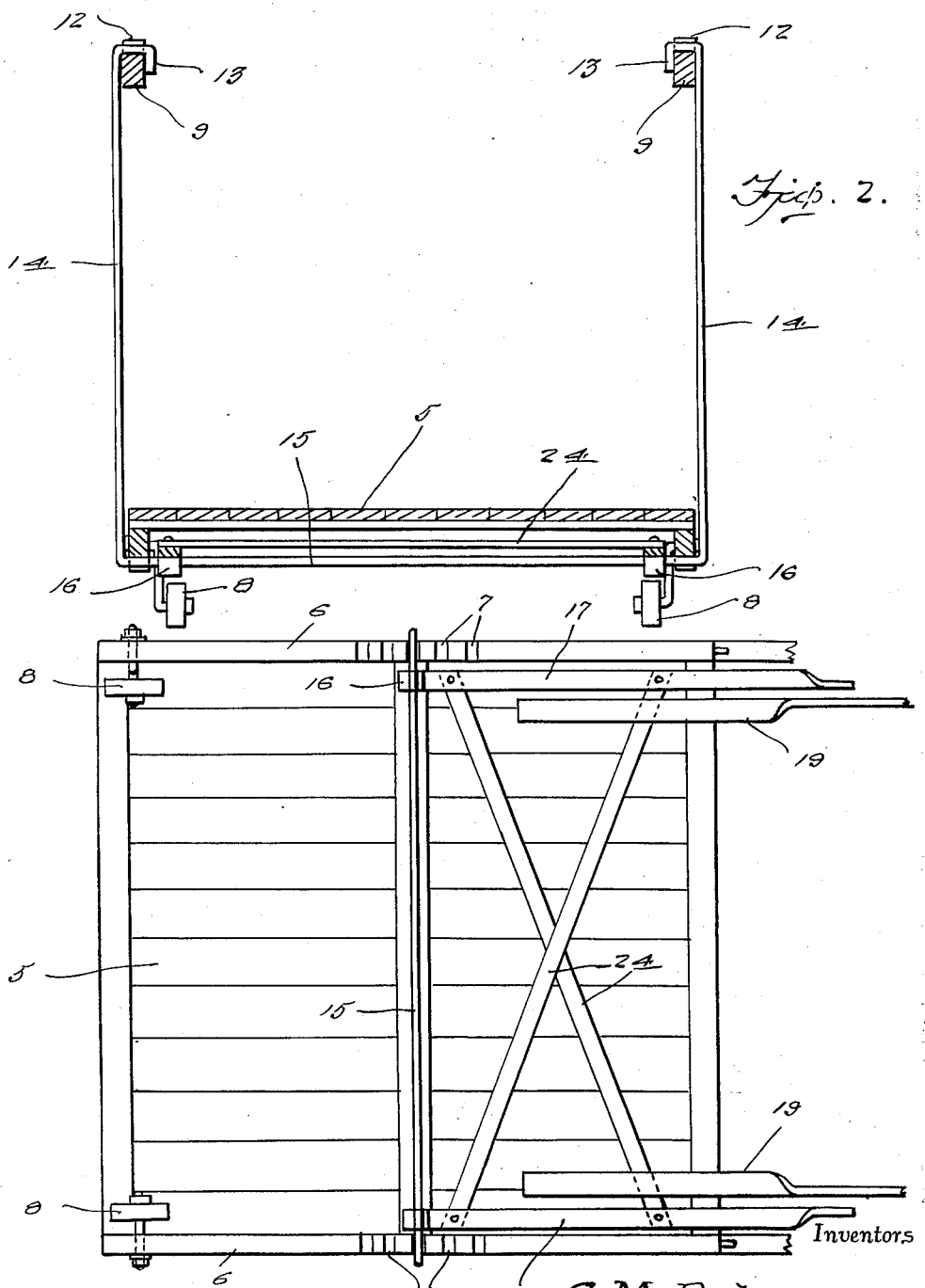

2,008,561

UNITED STATES PATENT OFFICE 2,008,561

STRAW AND FOLIAGE COLLECTOR ATTACHMENT FOR COMBINES

Samuel M. Rodgers and Noble P. Shelby, Lebanon, Ind.

Application December 31, 1934, Serial No. 759,996

6 Claims. (Cl. 56—122)

The invention is an attachment for combines and consists in the provision of a tilting platform arranged to receive straw bearing feed or grain from the straw walker and shaker shoe of a combine that would otherwise be lost or wasted; and which platform will automatically tilt under the weight of the straw thereon for stacking the straw or foliage in small cocks about the field.

A further object of the invention is to provide improved means for mounting the platform at the rear of the combine.

The invention together with its objects and advantages will be best understood from a study of the following description taken in connection with the accompanying drawings wherein:

Figure 1 is a side elevational view illustrating the application of the invention.

Figure 2 is a vertical sectional view taken substantially on line 2—2 of Figure 1.

Figure 3 is a detail view taken substantially on the line 3—3 of Figure 1.

Referring to the drawings by reference numerals it will be seen that the attachment comprises a platform 5 formed of planks, and having at its underside opposed longitudinally extending bars 6 formed intermediate their ends with notches 7, and provided at one end with rollers 8.

For supporting the platform 5 there are provided a pair of suspension bars 9 that are secured in any suitable manner and as indicated generally at 10 in Figure 1 at the rear of a combine a portion of which is shown in the drawings and indicated generally by the reference numeral 11.

Adjacent their outer free ends the bars 9 are provided in their upper edges with a series of notches 12 with which the hooked upper ends 13 of the sides or legs 14 of a U-shaped member 15 selectively engaged. At its closed end, the U-shaped member 15 selectively engages notches 7 as shown in the drawings. At said closed end, the U-shaped member 15 also extends through eyes 16 formed on the ends of rearwardly extending bars 17 that at one end have upstanding ends 17a secured to the sides of the combine 11 as at 18.

For supporting the end of the platform 5 remote from the rollers 8 there are secured to opposite sides of the combine 11 bars 19 that have longitudinally twisted ends 19a extending rearwardly to engage the underside of the paltform as best suggested in Figures 1 and 3.

From the above it will be apparent that in actual practice, the U-shaped member is engaged with selected notches 7 and 12 in a manner hereinbefore made manifest and dependent upon the size of the cock or stack that is desired. Normally the platform is in a horizontal position, as shown, and in this position receives the waste straw bearing feed or grain from the straw walker and shaker shoe of the combine 11. When the weight of the straw on the platform 5 overcomes the springs 20 hereinafter more fully referred to, the platform 5 is caused to tilt in a counterclockwise direction so that the threshed foliage thereon will be deposited in a stack or cock on the ground.

When the platform 5 is free of the weight of the threshed foliage the platform under action of the springs 20 is returned to its normal position, springs 20 being disposed at opposite sides of the combine 11 and connected at one end and through the medium of short sections of chain 21 with one end of the platform 5 and at an opposite end, and through the medium of short chain sections 22 with angular brackets 23 suitably secured to the sides of the combine as clearly shown in Figure 1. The springs 20 normally act on the end of the platform 5 to yieldably retain the same in a horizontal position.

It will also be apparent that by providing the rollers 8 no damage will be done to the attachment when the platform is in tilted position and a reverse movement of the combine is necessitated, as is the case when for example, the sickle guards of the combine choke.

To prevent the U-bar 15 which may be termed the hanger bar, from swaying the bars 17 are braced through the medium of crossed bars 24 as best shown in Figure 3.

Having thus described the invention, what is claimed as new is:

1. In a combine, a platform, means for tiltably supporting the platform at the rear end of the combine for receiving straw bearing feed or grain from the straw walker and shaker shoe of the combine, and means normally supporting the platform in a substantially horizontal position; said platform being tiltable in response to the weight of the straw thereon for dumping the straw.

2. In a combine, a pair of suspension bars extending rearwardly from the combine at opposite sides thereof, a hanger bar suspended from said suspension bars, a platform pivotally supported by said hanger bar, and stop means at the rear end of the combine with which one end of the platform engages.

3. In a combine, a pair of suspension bars extending rearwardly from the combine at opposite sides thereof, a hanger bar suspended from said suspension bars, a platform pivotally supported by said hanger bar, stop means at the rear end of the combine with which one end of the platform engages, said suspension bars having notches therein, and said hanger bar being of substantially U-shaped form the sides of which are provided with terminal hooks adapted to engage selected notches.

4. In a combine, a pair of suspension bars, extending rearwardly from the combine at opposite sides thereof, a hanger bar suspended from said suspension bars, a platform pivotally supported by said hanger bar, and stop means at the rear of the combine with which one end of the platform engages, said suspension bars having notches therein, said hanger bar being of substantially U-shaped form the sides of which are provided with terminal hooks adapted to engage selected notches, said platform having opposed side bars provided with notches with which said hanger bar at the closed end thereof selectively engage.

5. In a combine, a pair of suspension bars, extending rearwardly from the combine at opposite sides thereof, a hanger bar suspended from said suspension bars, a platform pivotally supported by said hanger bar, stop means at the rear end of the combine with which one end of the platform engages, said suspension bars having notches therein, said hanger bar being of substantially U-shaped form the sides of which are provided with terminal hooks adapted to engage selected notches, said platform having opposite side bars provided with notches with which said hanger bar at the closed end thereof selectively engages, and rollers on the end of the platform farthest remote from the combine.

6. In a combine, a pair of suspension bars extending rearwardly from the combine at opposite sides thereof, a hanger bar suspended from said suspension bars, a platform pivotally supported by said hanger bar, stop means at the rear end of the combine with which one end of the platform engages, said suspension bars having notches therein, said hanger bar being of substantially U-shaped form the sides of which are provided with terminal hooks adapted to engage selected notches, said platform having opposite side bars provided with notches with which said hanger bar at the closed end thereof selectively engages, rollers on the end of the platform farthest remote from the combine, and spring devices connected with said combine and platform and yieldably retaining the platform in a substantially horizontal position.

SAMUEL M. RODGERS.
NOBLE P. SHELBY.